(12) United States Patent
Kondo

(10) Patent No.: US 9,586,630 B2
(45) Date of Patent: Mar. 7, 2017

(54) FRAME STRUCTURE FOR VEHICLE

(71) Applicant: Hino Motors, Ltd., Hino-shi (JP)

(72) Inventor: Hirofumi Kondo, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 14/767,979

(22) PCT Filed: Dec. 24, 2013

(86) PCT No.: PCT/JP2013/084459
§ 371 (c)(1),
(2) Date: Aug. 14, 2015

(87) PCT Pub. No.: WO2014/125739
PCT Pub. Date: Aug. 21, 2014

(65) Prior Publication Data
US 2015/0367898 A1    Dec. 24, 2015

(30) Foreign Application Priority Data

Feb. 14, 2013    (JP) .................................. 2013-026846

(51) Int. Cl.
*B62D 21/00* (2006.01)
*B62D 33/06* (2006.01)
(Continued)

(52) U.S. Cl.
CPC ......... *B62D 33/0604* (2013.01); *B62D 21/03* (2013.01); *B62D 21/09* (2013.01); *B62D 33/077* (2013.01)

(58) Field of Classification Search
CPC .... B62D 33/0604; B62D 21/03; B62D 21/09; B62D 33/077; B62D 21/02
See application file for complete search history.

(56) References Cited

U.S. PATENT DOCUMENTS 2,700,551 A    1/1955    Stump et al.
4,103,925 A *  8/1978    Palamara .............. B60P 3/1075
                                                                193/38
(Continued)

FOREIGN PATENT DOCUMENTS

CN    101596917 A    12/2009
CN    202413924 U    9/2012
(Continued)

OTHER PUBLICATIONS

International Search Report issued Mar. 11, 2014 in PCT/JP2013/084459.
(Continued)

*Primary Examiner* — Faye M Fleming
(74) *Attorney, Agent, or Firm* — Oblon, McClelland, Maier & Neustadt, L.L.P.

(57) ABSTRACT

Provided is a frame structure for a vehicle including: a pair of main side rails which extends in the vehicle longitudinal direction and faces each other; and an extension side rail which is connected to a front portion of the main side rail in the vehicle longitudinal direction and extends in the vehicle longitudinal direction, wherein the extension side rail is formed so as to have a substantially C-shaped cross-section and is formed so that a front portion is lower than a rear portion in the vehicle longitudinal direction.

8 Claims, 13 Drawing Sheets

(51) Int. Cl.
  *B62D 21/03* (2006.01)
  *B62D 21/09* (2006.01)
  *B62D 33/077* (2006.01)

(56) References Cited

U.S. PATENT DOCUMENTS

| | | | | |
|---|---|---|---|---|
| 6,874,816 | B2* | 4/2005 | Herrmann | B60G 3/20 |
| | | | | 280/781 |
| 8,020,925 | B2* | 9/2011 | Miura | B62D 21/152 |
| | | | | 296/190.05 |
| 2003/0227165 | A1 | 12/2003 | Herrmann et al. | |
| 2011/0025035 | A1 | 2/2011 | Beuss et al. | |
| 2012/0313360 | A1* | 12/2012 | Akaki | B62D 21/02 |
| | | | | 280/784 |
| 2016/0121929 | A1* | 5/2016 | Levin | B62D 21/03 |
| | | | | 296/193.02 |

FOREIGN PATENT DOCUMENTS

| | | |
|---|---|---|
| DE | 102008039949 A1 | 3/2010 |
| EP | 1359031 A2 | 11/2003 |
| JP | 4-026182 U | 3/1992 |
| JP | 2000-190867 | 7/2000 |
| JP | 2002-120754 | 4/2002 |
| JP | 2003-327154 | 11/2003 |
| JP | 2004-291665 | 10/2004 |
| JP | 2005-75018 | 3/2005 |
| JP | 2005-132200 | 5/2005 |
| JP | 2006-111228 | 4/2006 |
| JP | 2006-513082 | 4/2006 |
| JP | 2009-154781 | 7/2009 |
| WO | WO 2010/030257 A1 | 3/2010 |

OTHER PUBLICATIONS

International Preliminary Report on Patentability issued Aug. 27, 2015 in PCT/JP2013/084459 filed on Dec. 24, 2013.
Combined Chinese Office Action and Search Report issued Jul. 25, 2016 in Patent Application No. 201380072954.7 (with English translation of categories of cited documents).
Extended European Search Report issued Dec. 8, 2016 in Patent Application No. 13874910.6.

* cited by examiner

FRAME STRUCTURE FOR VEHICLE

TECHNICAL FIELD

The present invention relates to a frame structure for a vehicle such as a truck.

BACKGROUND ART

Hitherto, there is known a frame of a vehicle such as a truck including a pair of side rails extending in the vehicle longitudinal direction while facing each other. Then, the side rail of the related art has a substantially C-shaped cross-section (as a channel shape) as in channel steel. However, in order to dispose a cab above a front portion of a side rail and to dispose a plurality of wiring lines between the side rail and the cab, the front portion is formed so as to be lower than a rear portion.

CITATION LIST

Patent Literature

Patent Literature 1: JP 2004-291665 A

SUMMARY OF INVENTION

Technical Problem

Incidentally, since the side rail with such a shape does not have the same cross-section in the vehicle longitudinal direction, the side rail may not be formed by simple roll forming. For this reason, the side rail was formed by pressing in the related art.

However, when the side rail is formed by pressing, a problem arises in that an enormous and expensive pressing mold and equipment need to be prepared and some time is spent for forming the side rail. Further, since an enormous and expensive pressing mold needs to be prepared for each vehicle type, a problem also arises in that manufacturing cost is extremely high.

In this regard, Patent Literature 1 discloses a method in which the side rail is formed by roll forming. In the method disclosed in Patent Literature 1, a rectangular iron plate is first bent by roll forming so as to form a side rail having a substantially C-shaped cross-section and an upper portion of a front portion of the side rail is obliquely cut. Then, an auxiliary frame provided with a surface inclined downward and forward is inserted into the cut portion of the side rail, and the auxiliary frame is connected and fixed to the side rail by the fastening of a bolt. Accordingly, the side rail of which the front portion is low is manufactured.

However, even in the method disclosed in Patent Literature 1, a step of cutting the side rail and a step of connecting the auxiliary frame to the side rail are needed. For this reason, there still remains a room for an improvement in that the side rail needs to be easily manufactured.

Here, an object of the first aspect of the invention is to provide a frame structure for a vehicle which is easily manufactured while an increase in manufacturing cost is suppressed.

Solution to Problem

According to a first aspect of the invention, there is provided a frame structure for a vehicle including: a pair of main side rails which extends in the vehicle longitudinal direction and faces each other; and an extension side rail which is connected to a front portion of the main side rail in the vehicle longitudinal direction and extends in the vehicle longitudinal direction. Further, the extension side rail is formed so as to have a substantially C-shaped cross-section, and is formed so that a front portion is lower than a rear portion in the vehicle longitudinal direction. In addition, a shape of a substantially C-shaped cross-section is also referred to as a channel shape.

As an embodiment, a side rail connection portion in which the main side rail and the extension side rail are connected to each other is provided with a spring bracket attachment portion for attaching a spring bracket of a leaf spring.

Further, as an embodiment, the main side rail includes a main side rail side plate portion which extends in the vehicle height direction, a main side rail upper plate portion which extends from the upper edge of the side plate portion inward in the vehicle width direction, and a main side rail lower plate portion which extends from the lower edge of the side plate portion inward in the vehicle width direction. Further, the extension side rail includes an extension side rail side plate portion which extends in the vehicle height direction, an extension side rail upper plate portion which extends from the upper edge of the extension side rail side plate portion inward in the vehicle width direction, and an extension side rail lower plate portion which extends from the lower edge of the extension side rail side plate portion inward in the vehicle width direction. Furthermore, the extension side rail side plate portion and the main side rail side plate portion are rigidly connected to each other, and the extension side rail lower plate portion and the main side rail lower plate portion are rigidly connected to each other. In addition, the extension side rail upper plate portion and the main side rail upper plate portion are not rigidly connected to each other.

Further, as an embodiment, the frame structure for the vehicle further includes a cross member that extends in the vehicle width direction while both ends thereof are connected to the pair of extension side rails. Further, a cross member connection portion in which the extension side rail and the cross member are connected to each other is provided with a cab mount attachment portion to which a cab mount supporting a cab of the vehicle is attached.

Further, as an embodiment, the frame structure for the vehicle further includes a reinforcement member that is connected to the cross member at the cross member connection portion so as to form a closed cross-section along with the cross member.

Further, as an embodiment, the cross member includes a cross member side plate portion which extends in the vehicle height direction, a cross member upper plate portion which extends from the upper edge of the cross member side plate portion backward in the vehicle longitudinal direction, and a cross member lower plate portion which extends from the lower edge of the cross member side plate portion backward in the vehicle longitudinal direction. Further, the reinforcement member includes a reinforcement member side plate portion which extends in the vehicle height direction, a reinforcement member upper plate portion which extends from the upper edge of the reinforcement member side plate portion forward in the vehicle longitudinal direction, and a reinforcement member lower plate portion which extends from the lower edge of the reinforcement member side plate portion backward in the vehicle longitudinal direction. Furthermore, the reinforcement member upper plate portion and the cross member upper plate portion are rigidly connected to each other, and the reinforcement member lower plate portion and the cross member lower plate portion are rigidly connected to each other.

Advantageous Effects of Invention

According to a first aspect and an embodiment of the invention, it is possible to provide a frame structure for a vehicle which is easily manufactured while an increase in manufacturing cost is suppressed.

DESCRIPTION OF EMBODIMENTS

Figure 1:
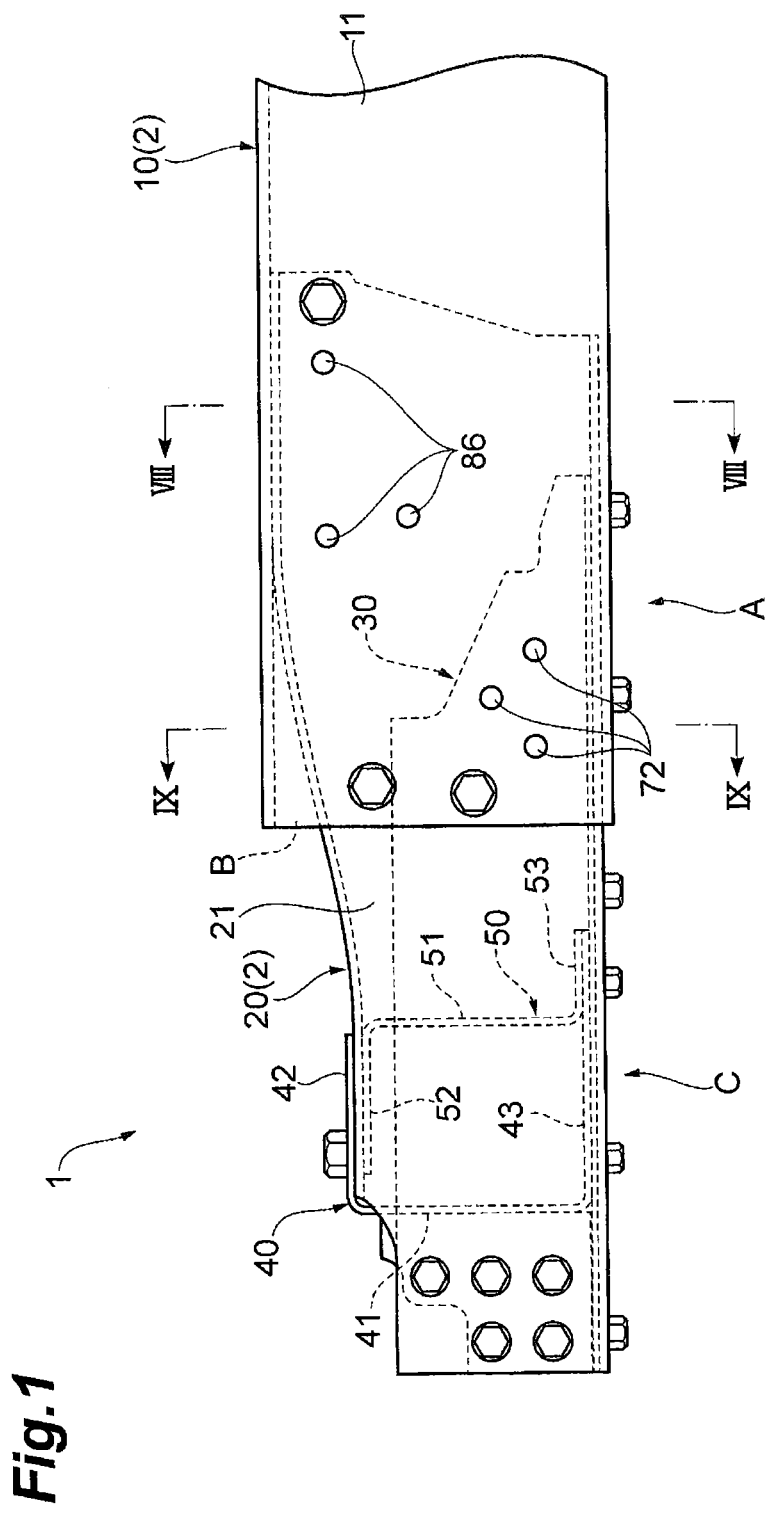
FIG. 1 is a side view illustrating a frame structure for a vehicle according to an embodiment.

Hereinafter, an embodiment will be described in detail with reference to the drawings. In addition, the same reference numerals will be given to the same or equivalent components in the drawings, and the repetitive description thereof will not be presented. Further, in the description below, the up and down direction indicates the up and down direction in the vehicle height direction, the front and back direction indicates the front and back direction in the vehicle longitudinal direction, and the inward and outward direction indicates the inward and outward direction of the vehicle in the vehicle width direction.

Figure 2:
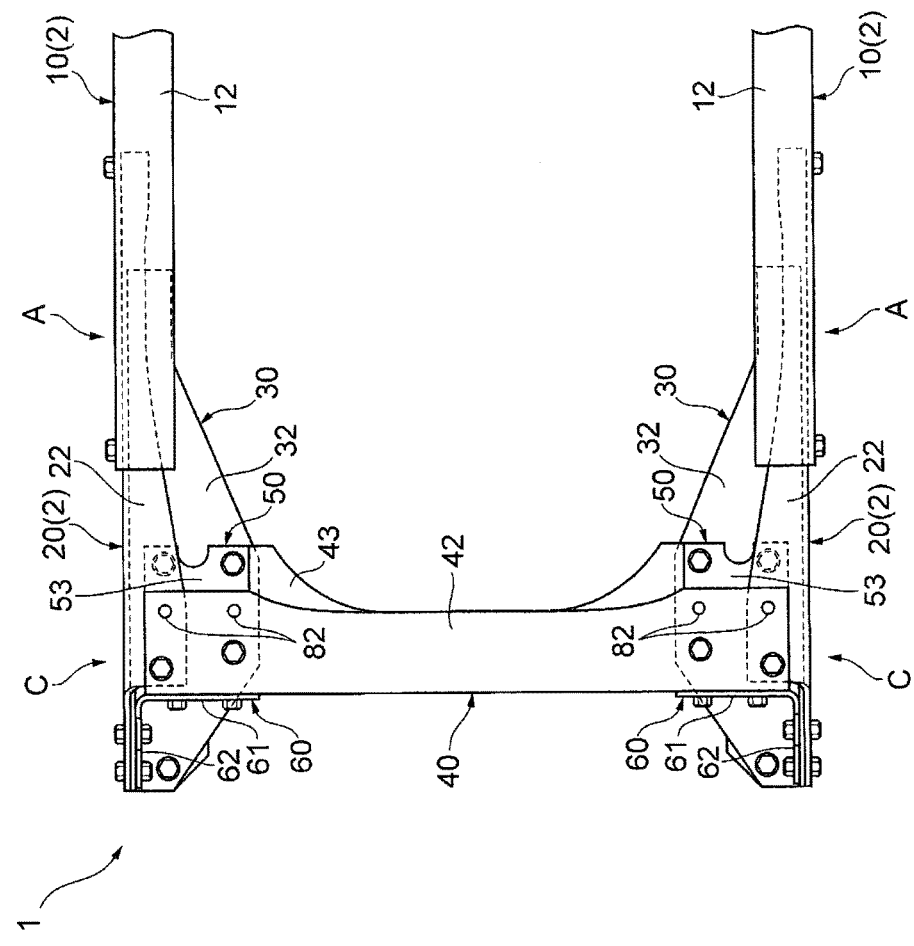
FIG. 2 is a top view illustrating the frame structure for the vehicle according to the embodiment.
Figure 3:
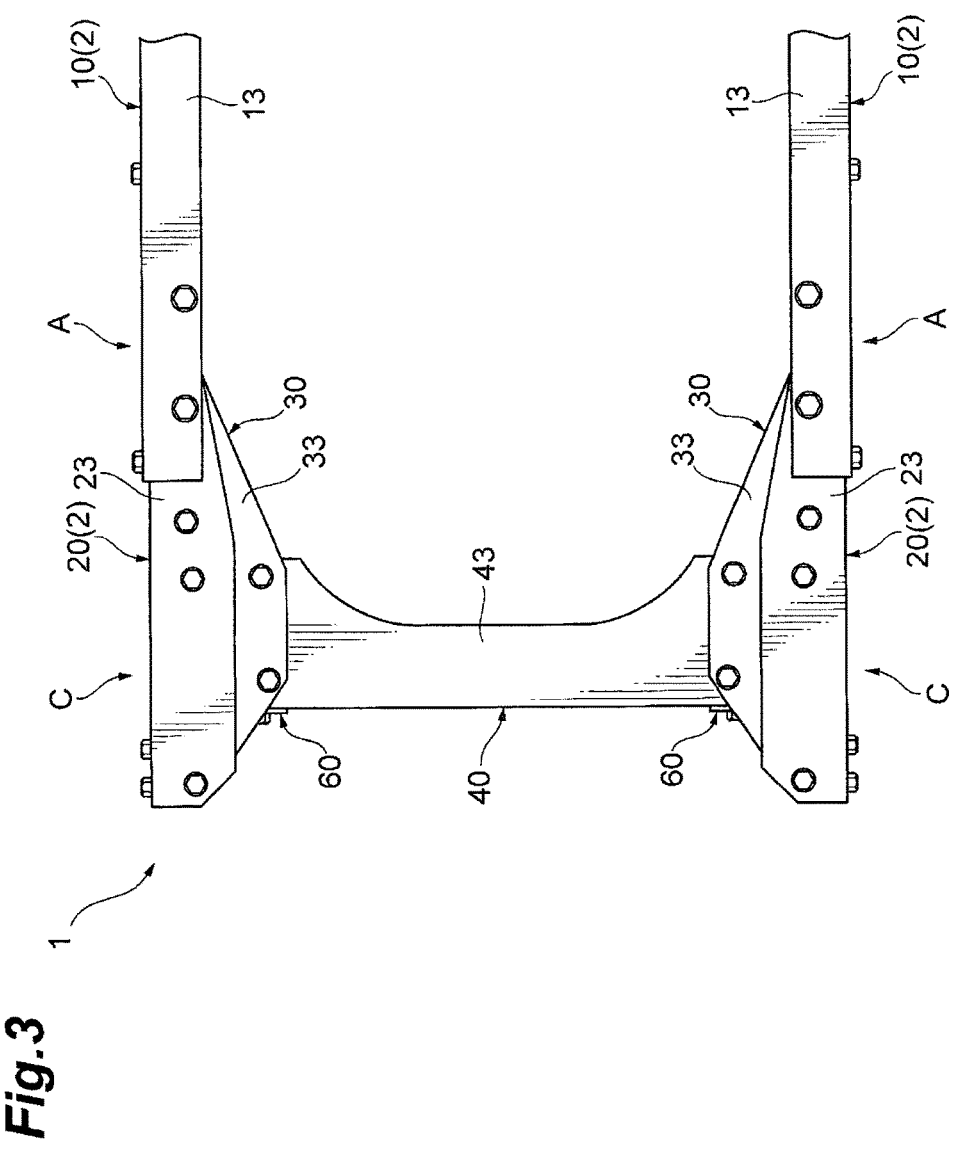
FIG. 3 is a bottom view illustrating the frame structure for the vehicle according to the embodiment.
Figure 4:
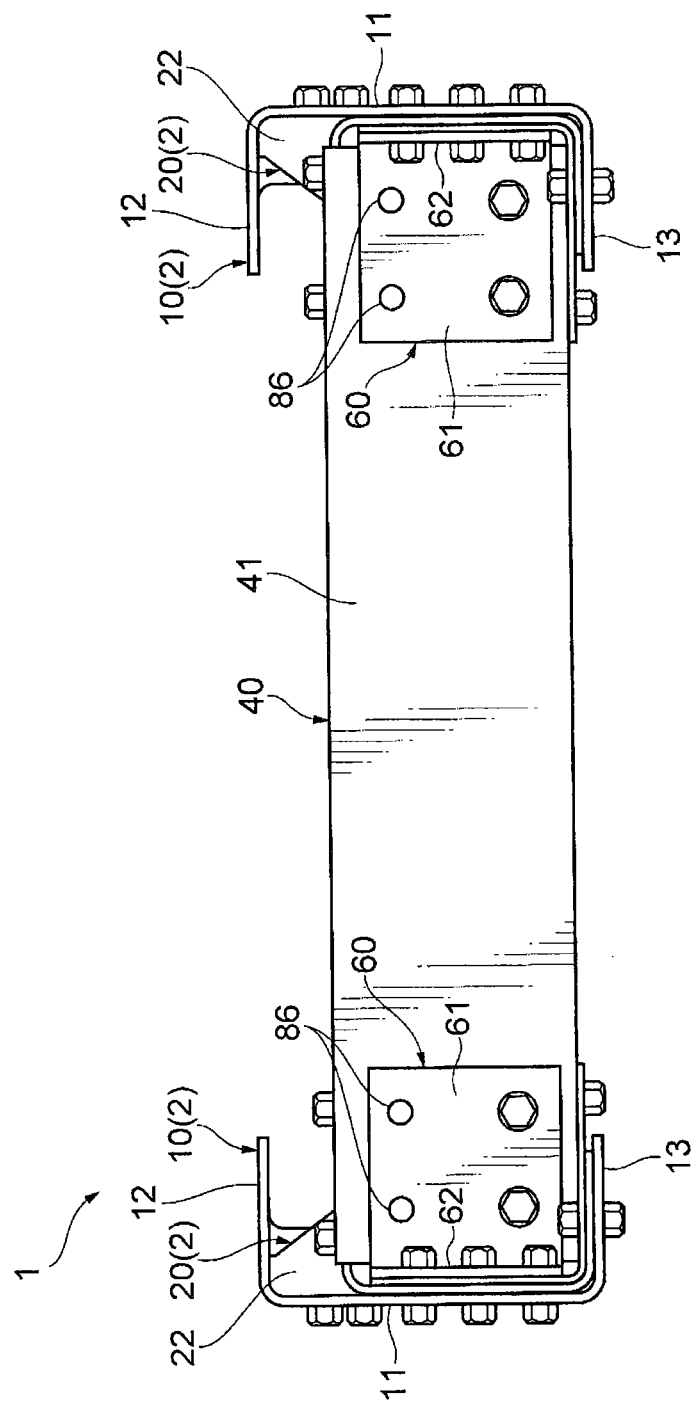
FIG. 4 is a front view illustrating the frame structure for the vehicle according to the embodiment.
Figure 5:
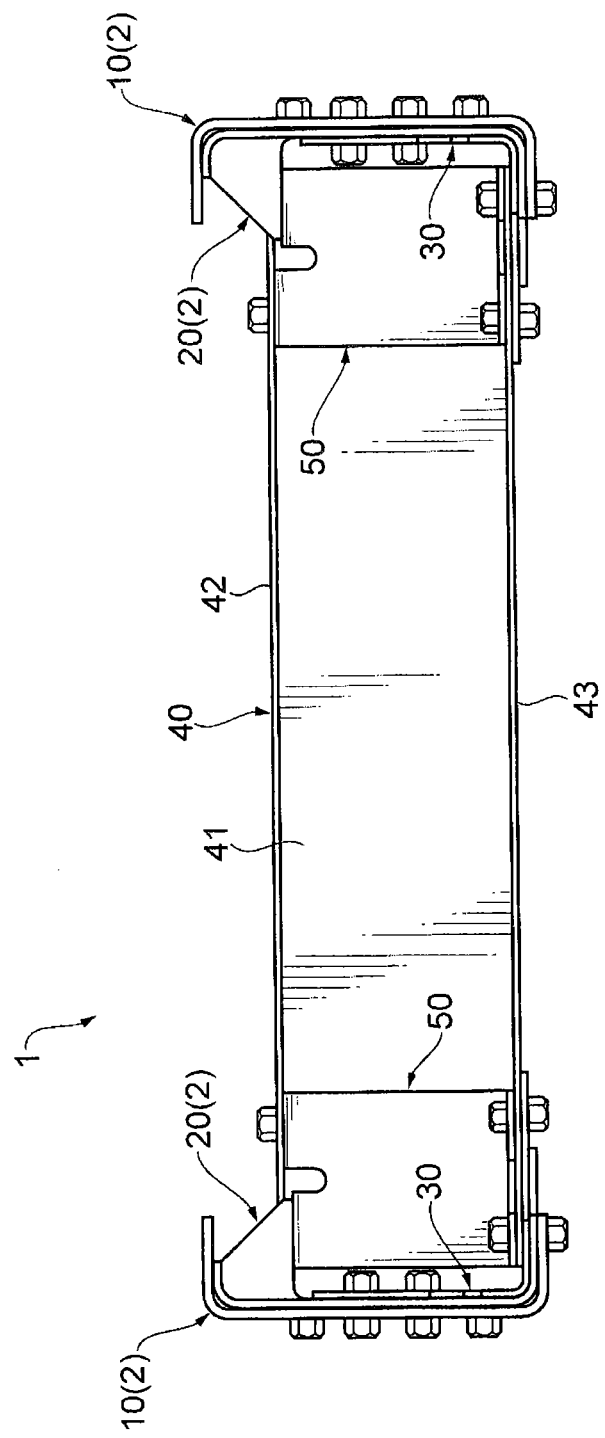
FIG. 5 is a rear view illustrating the frame structure for the vehicle according to the embodiment.
Figure 6:
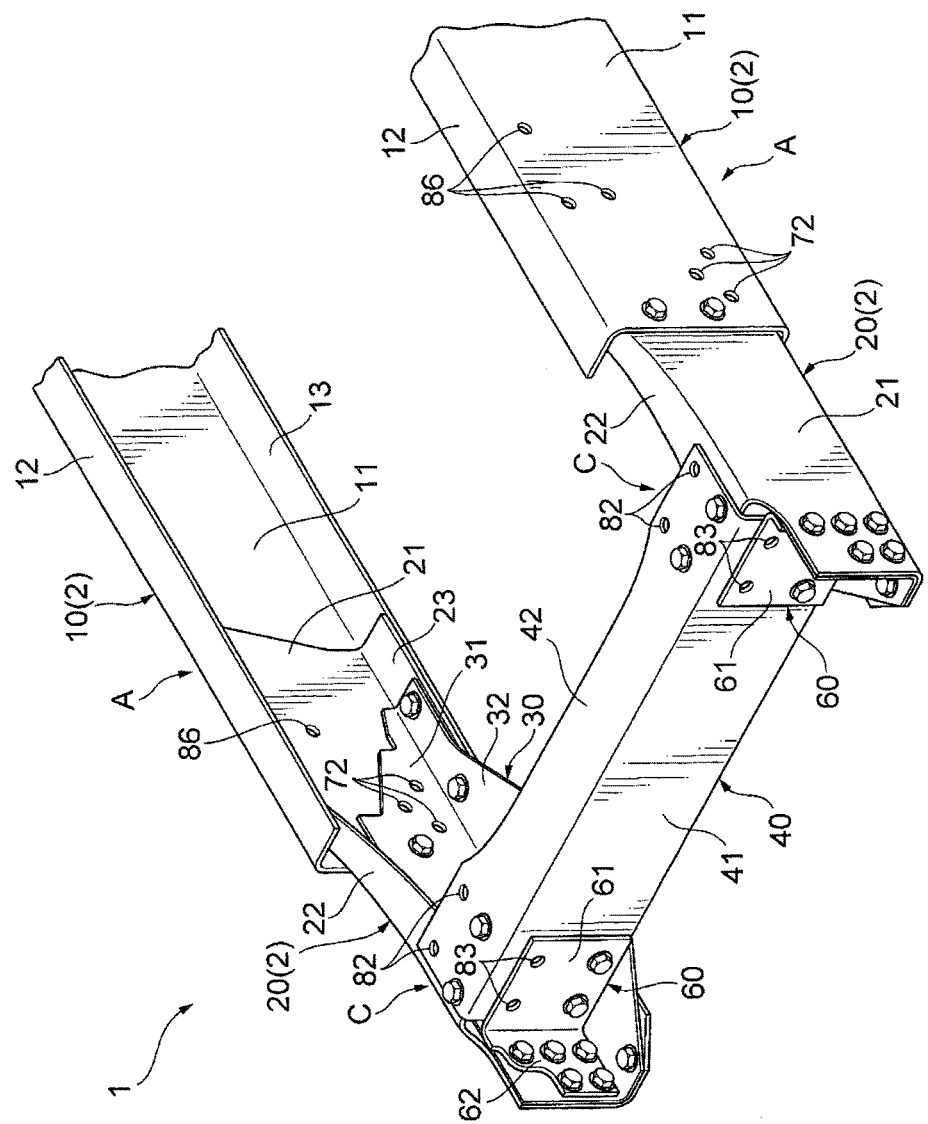
FIG. 6 is a perspective view illustrating the frame structure for the vehicle according to the embodiment when viewed from the front side thereof.
Figure 7:
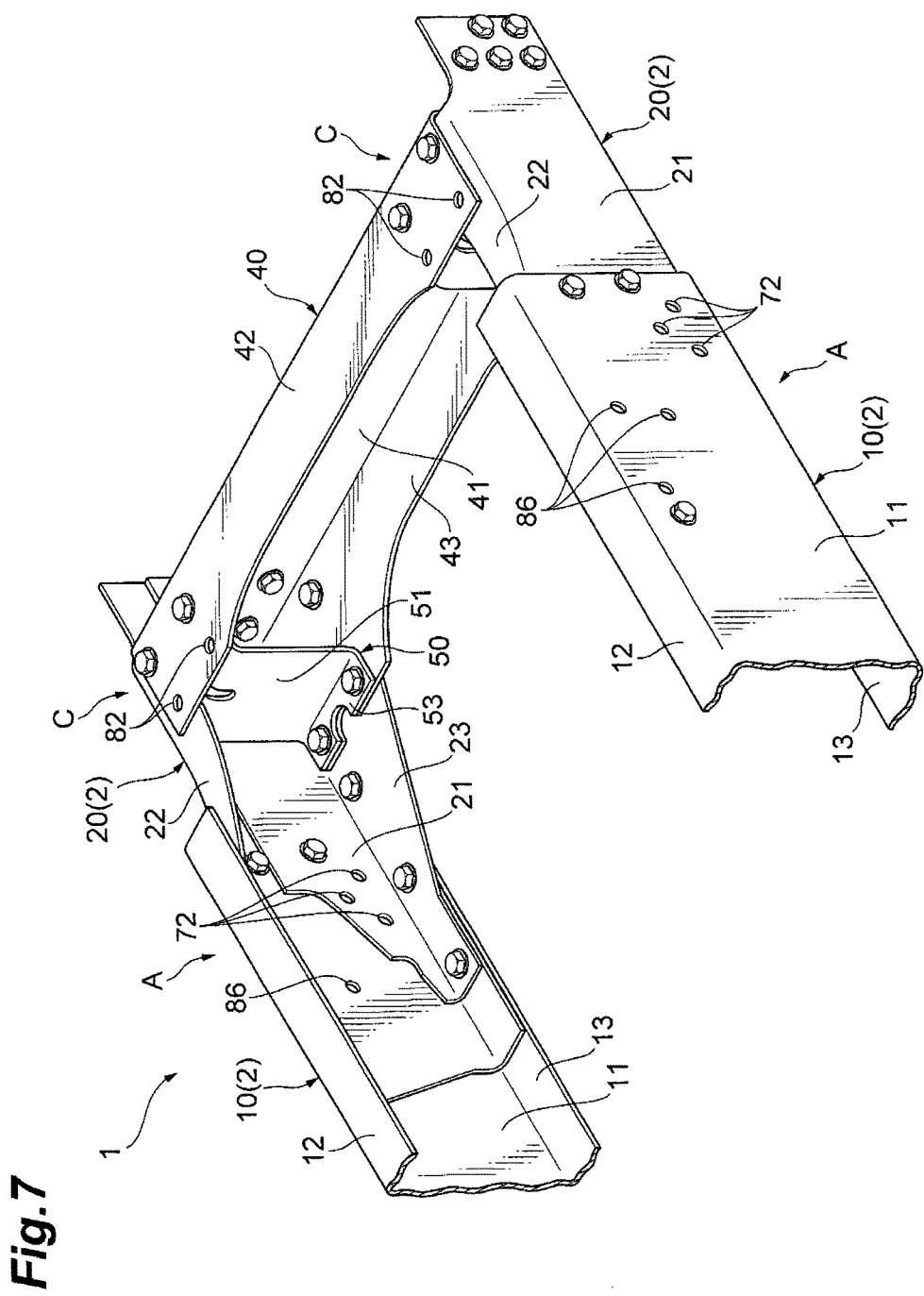
FIG. 7 is a perspective view illustrating the frame structure for the vehicle according to the embodiment when viewed from the rear side thereof.
Figure 8:
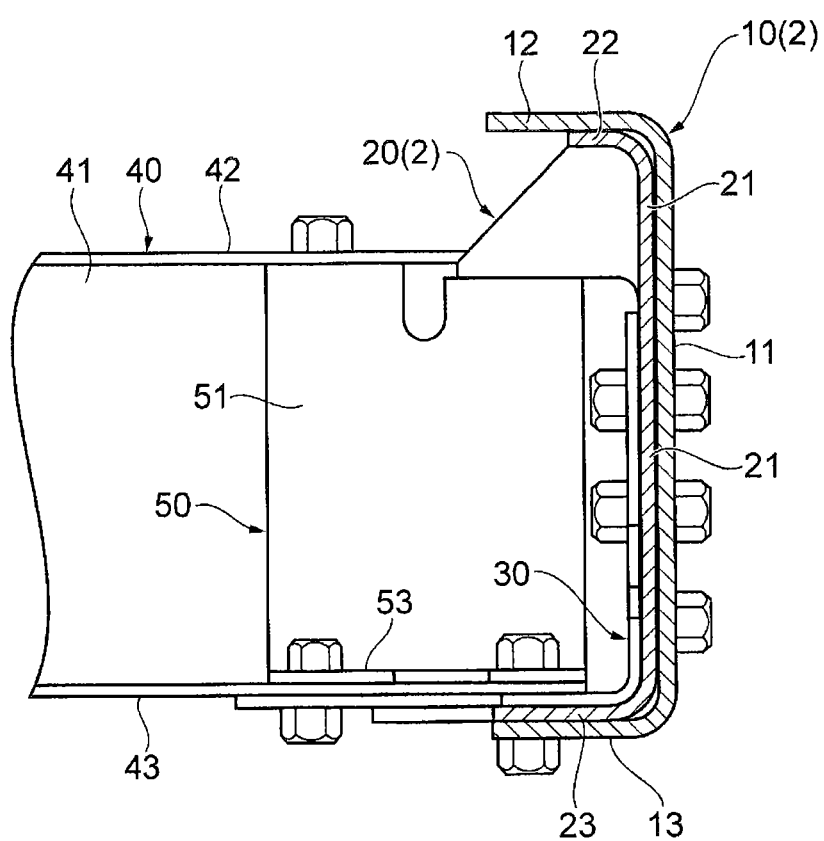
FIG. 8 is a cross-sectional view taken along the line VIII-VIII illustrated in FIG. 1.
Figure 9:
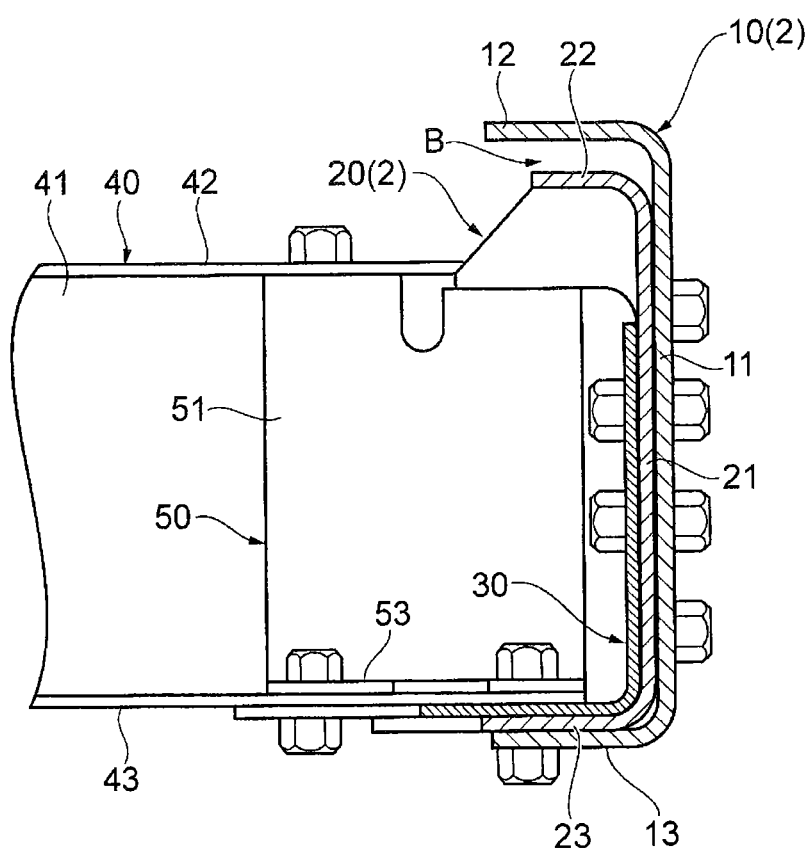
FIG. 9 is a cross-sectional view taken along the line IX-IX illustrated in FIG. 1.

FIG. 1 is a side view illustrating a frame structure for a vehicle according to an embodiment. FIG. 2 is a top view illustrating the frame structure for the vehicle according to the embodiment. FIG. 3 is a bottom view illustrating the frame structure for the vehicle according to the embodiment. FIG. 4 is a front view illustrating the frame structure for the vehicle according to the embodiment. FIG. 5 is a rear view illustrating the frame structure for the vehicle according to the embodiment. FIG. 6 is a perspective view illustrating the frame structure for the vehicle according to the embodiment when viewed from the front side thereof. FIG. 7 is a perspective view illustrating the frame structure for the vehicle according to the embodiment when viewed from the rear side thereof. FIG. 8 is a cross-sectional view taken along the line VIII-VIII illustrated in FIG. 1. FIG. 9 is a cross-sectional view taken along the line IX-IX illustrated in FIG. 1.

As illustrated in FIGS. 1 to 9, in a frame structure 1 for a vehicle according to the embodiment, a pair of side rails 2 extending in the vehicle longitudinal direction and facing each other is divided into a main side rail 10 which is disposed at the rear side in the vehicle longitudinal direction and an extension side rail 20 which is disposed at the front side in the vehicle longitudinal direction.

The main side rail 10 extends in a linear shape in the vehicle longitudinal direction from the rear end of the vehicle to a lower portion of a cab (not illustrated). The main side rail 10 has a substantially C-shaped cross-section (a U-shape) as in the channel steel and has the same cross-section in the longitudinal direction. In addition, a shape of such a substantially C-shaped cross-section is also referred to as a channel shape. Specifically, the main side rail 10 includes a main side rail side plate portion 11 which extends in the vehicle height direction and has a rectangular plate shape, a main side rail upper plate portion 12 which extends from the upper edge of the main side rail side plate portion 11 inward in the vehicle width direction and has a rectangular plate shape, and a main side rail lower plate portion 13 which extends from the lower edge of the main side rail side plate portion 11 inward in the vehicle width direction and has a rectangular plate shape. In addition, the main side rail 10 may be manufactured by, for example, simple bending such as roll forming disclosed in Patent Literature 1.

The extension side rail 20 extends in a linear shape in the vehicle longitudinal direction from a lower portion of a cab (not illustrated) to the front end of the vehicle. The extension side rail 20 has a substantially C-shaped cross-section (a U-shape) as in the channel steel. In addition, a shape of such a substantially C-shaped cross-section is also referred to as a channel shape. Specifically, the extension side rail 20 includes an extension side rail side plate portion 21 which extends in the vehicle height direction, an extension side rail upper plate portion 22 which extends from the upper edge of the extension side rail side plate portion 21 inward in the vehicle width direction, and an extension side rail lower plate portion 23 which extends from the lower edge of the extension side rail side plate portion 21 inward in the vehicle width direction. In addition, the extension side rail 20 may be manufactured by, for example, simple bending such as pressing.

Then, the front end of the main side rail 10 and the rear end of the extension side rail 20 are connected to each other while overlapping each other.

Here, a structure of a side rail connection portion A in which the main side rail 10 and the extension side rail 20 are connected to each other will be described in detail. The rear end of the extension side rail side plate portion 21 is rigidly connected (fastened) to the main side rail side plate portion 11 by the fastening of a bolt while overlapping the inside of the front end of the main side rail side plate portion 11. Further, the rear end of the extension side rail lower plate portion 23 is rigidly connected to the main side rail lower plate portion 13 by the fastening of a bolt while overlapping the inside of the front end of the main side rail lower plate portion 13. Meanwhile, the rear end of the extension side rail upper plate portion 22 overlaps the inside of the front end of the main side rail upper plate portion 12, but is not rigidly connected to the main side rail lower plate portion 13 by the fastening of a bolt. That is, the main side rail 10 and the extension side rail 20 are rigidly connected to each other only at the lower plate portion and the side plate portion, and are not rigidly connected to each other at the upper plate portion.

Further, the extension side rail 20 is formed so that the front portion is lower than the rear portion in the vehicle longitudinal direction in order to ensure a space for disposing a cab (not illustrated) at an upper position. Specifically, the lower edge of the extension side rail side plate portion 21 extends in a linear shape, and the extension side rail lower plate portion 23 is formed in a flat plate shape in the vehicle longitudinal direction along the lower edge of the extension side rail side plate portion 21. Meanwhile, the upper edge of the extension side rail side plate portion 21 is inclined downward and forward in a curved shape (so as to be inclined lower) in the vehicle longitudinal direction, and the extension side rail upper plate portion 22 is formed in a curved plate shape which is inclined downward and forward in a curved shape (so as to be inclined lower) in the vehicle longitudinal direction along the upper edge of the extension side rail side plate portion 21.

Then, the main side rail 10 extends to a position where the extension side rail 20 is low in order to further extend the main side rail 10 forward while ensuring a space for disposing a cab (not illustrated) at an upper position. For this reason, the main side rail upper plate portion 12 and the extension side rail upper plate portion 22 overlap each other only at the rear portion of the side rail connection portion A, and a gap B is formed between the main side rail upper plate portion 12 and the extension side rail upper plate portion 22 at the front portion of the side rail connection portion A.

The frame structure 1 for the vehicle according to the embodiment further includes a pair of first reinforcement members 30 that is disposed between the main side rail 10 and the extension side rail 20, a cross member 40 that is connected to the pair of extension side rails 20, and a second reinforcement member 50 and a third reinforcement member 60 that are connected to the extension side rail 20 and the cross member 40.

The first reinforcement member 30 is a reinforcement member that is disposed between the main side rail 10 and the extension side rail 20 so as to improve the rigidity of the extension side rail 20. Then, the rear end of the first reinforcement member 30 is disposed at the side rail connection portion A, and the front end of the first reinforcement member 30 is disposed at the front end of the extension side rail 20.

The first reinforcement member 30 extends in a linear shape in the vehicle longitudinal direction and has a substantially L-shaped cross-section. Specifically, the first reinforcement member 30 includes a first reinforcement member side plate portion 31 which extends in the vehicle height direction and a first reinforcement member lower plate portion 32 which extends from the lower edge of the first reinforcement member side plate portion 31 inward in the vehicle width direction.

Then, the first reinforcement member side plate portion 31 is disposed between the main side rail side plate portion 11 and the extension side rail side plate portion 21, and is rigidly connected to the main side rail side plate portion 11 and the extension side rail side plate portion 21 by the fastening of a bolt. Further, the first reinforcement member lower plate portion 32 is disposed between the main side rail lower plate portion 13 and the extension side rail lower plate portion 23, and is rigidly connected to the main side rail lower plate portion 13 and the extension side rail lower plate portion 23 by the fastening of a bolt.

The cross member 40 extends in a linear shape in the vehicle width direction, and both ends thereof are connected to the front portions of the pair of extension side rails 20. The cross member 40 has a substantially C-shaped cross-section (a U-shape). Specifically, the cross member 40 includes a cross member side plate portion 41 which extends in the vehicle height direction, a cross member upper plate portion 42 which extends from the upper edge of the cross member side plate portion 41 backward in the vehicle longitudinal direction, and a cross member lower plate portion 43 which extends from the lower edge of the cross member side plate portion 41 backward in the vehicle longitudinal direction. In addition, the cross member 40 may be manufactured by, for example, simple bending such as roll forming disclosed in Patent Literature 1.

Then, both ends of the cross member 40 are connected to the front portions of the pair of extension side rails 20 in relation to the side rail connection portions A.

Here, a structure of a cross member connection portion C in which the pair of extension side rails 20 is connected to the cross member 40 will be described in detail. Both ends of the cross member upper plate portion 42 are rigidly connected to the extension side rail upper plate portions 22 by the fastening of a bolt while overlapping the outside (the upside) of the pair of extension side rail upper plate portions 22. Further, both ends of the cross member lower plate portion 43 are rigidly connected to the extension side rail lower plate portions 23 by the fastening of a bolt while overlapping the inside (the upside) of the pair of extension side rail lower plate portions 23. In addition, the extension side rail upper plate portion 22 is formed so that the front portion thereof in relation to the cross member connection portion C is notched, and the extension side rail side plate portion 21 and the extension side rail lower plate portion 23 extend to the front side of the extension side rail upper plate portion 22. Then, the front end of the extension side rail upper plate portion 22 abuts against the inside of the cross member side plate portion 41, and the extension side rail side plate portion 21 and the extension side rail lower plate portion 23 extend to the front side of the cross member 40.

Further, the pair of extension side rail upper plate portions 22 and the pair of extension side rail lower plate portions 23 gradually increase in width toward the cross member connection portion C. Similarly, the cross member upper plate portion 42 and the cross member lower plate portion 43 gradually increase in width toward the cross member connection portion C. Accordingly, the rigidity of the cross member connection portion C may be improved.

The second reinforcement member 50 is a reinforcement member that improves the rigidity of the cross member connection portion C by forming a closed cross-section along with the cross member 40.

The second reinforcement member 50 has a substantially Z-shaped cross-section, and extends in a linear shape in the vehicle width direction. Specifically, the second reinforcement member 50 includes a second reinforcement member side plate portion 51 which extends in the vehicle height direction, a second reinforcement member upper plate portion 52 which extends from the upper edge of the second reinforcement member side plate portion 51 forward in the vehicle longitudinal direction, and a second reinforcement member lower plate portion 53 which extends from the lower edge of the second reinforcement member side plate portion 51 backward in the vehicle longitudinal direction.

The second reinforcement member 50 is disposed inside the cross member 40. Then, the second reinforcement member upper plate portion 52 is rigidly connected to the cross member upper plate portion 42 and the extension side rail upper plate portion 22 by the fastening of a bolt while overlapping the cross member upper plate portion 42 and the extension side rail upper plate portion 22. Further, the second reinforcement member lower plate portion 53 is rigidly connected to the cross member lower plate portion 43, the extension side rail lower plate portion 23, and the first reinforcement member lower plate portion 33 by the fastening of a bolt while overlapping the cross member lower plate portion 43, the extension side rail lower plate portion 23, and the first reinforcement member lower plate portion 33. Accordingly, a closed cross-section is formed by the cross member 40 and the second reinforcement member 50.

The third reinforcement member 60 is a reinforcement member that improves the rigidity of the cross member connection portion C by connecting the cross member 40 and the extension side rail 20 to each other.

The third reinforcement member 60 has a substantially L-shaped cross-section, and extends in a linear shape in the vehicle height direction. Specifically, the third reinforcement member 60 includes a first side plate portion 61 of the third reinforcement member so as to extend in the vehicle width direction and a second side plate portion 62 of the third reinforcement member so as to extend from the outer edge of the first side plate portion 61 of the third reinforcement member in the vehicle width direction forward in the vehicle longitudinal direction.

The third reinforcement member 60 is disposed at the front side of the cross member 40. Then, the first side plate portion 61 of the third reinforcement member is rigidly connected to the cross member side plate portion 41 by the fastening of a bolt while overlapping the cross member side plate portion 41. Further, the second side plate portion 62 of the third reinforcement member is rigidly connected to the extension side rail side plate portion 21 and the first reinforcement member side plate portion 31 by the fastening of a bolt while overlapping the extension side rail side plate portion 21 and the first reinforcement member side plate portion 31.

Figure 10:
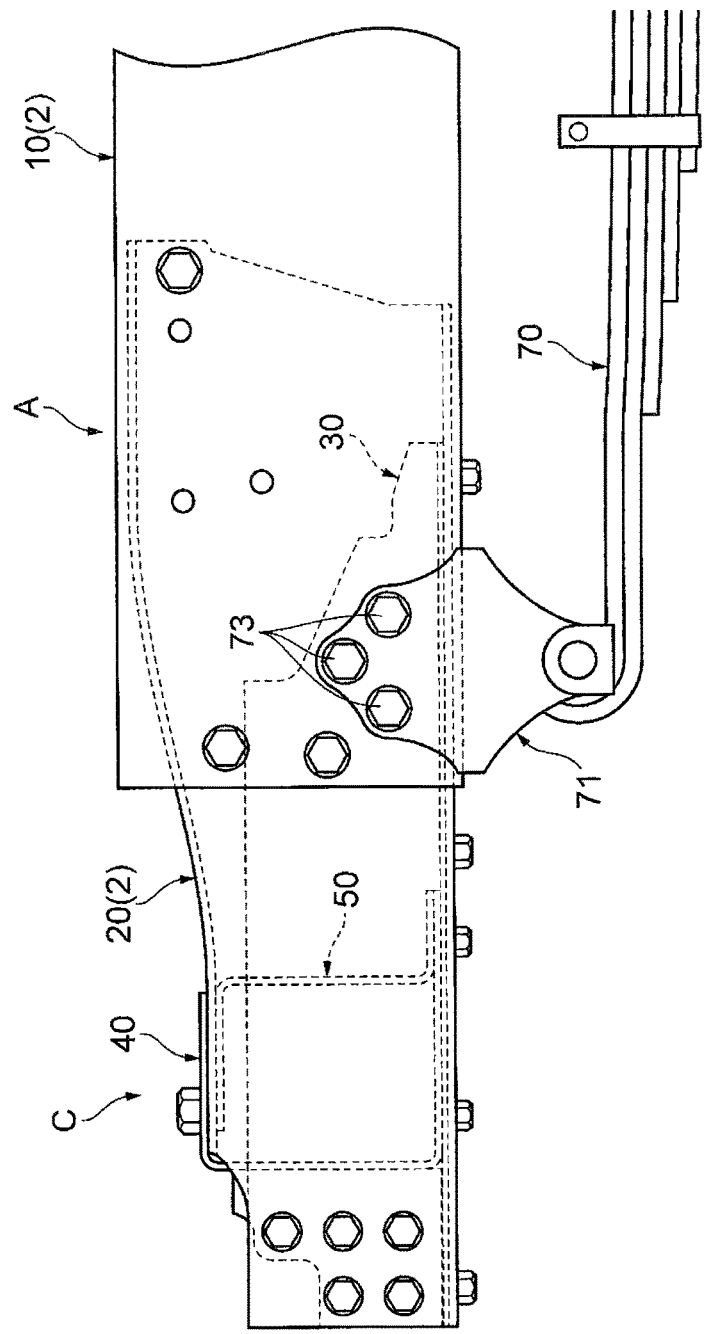
FIG. 10 is a side view illustrating a state where a spring bracket is attached.
Figure 11:
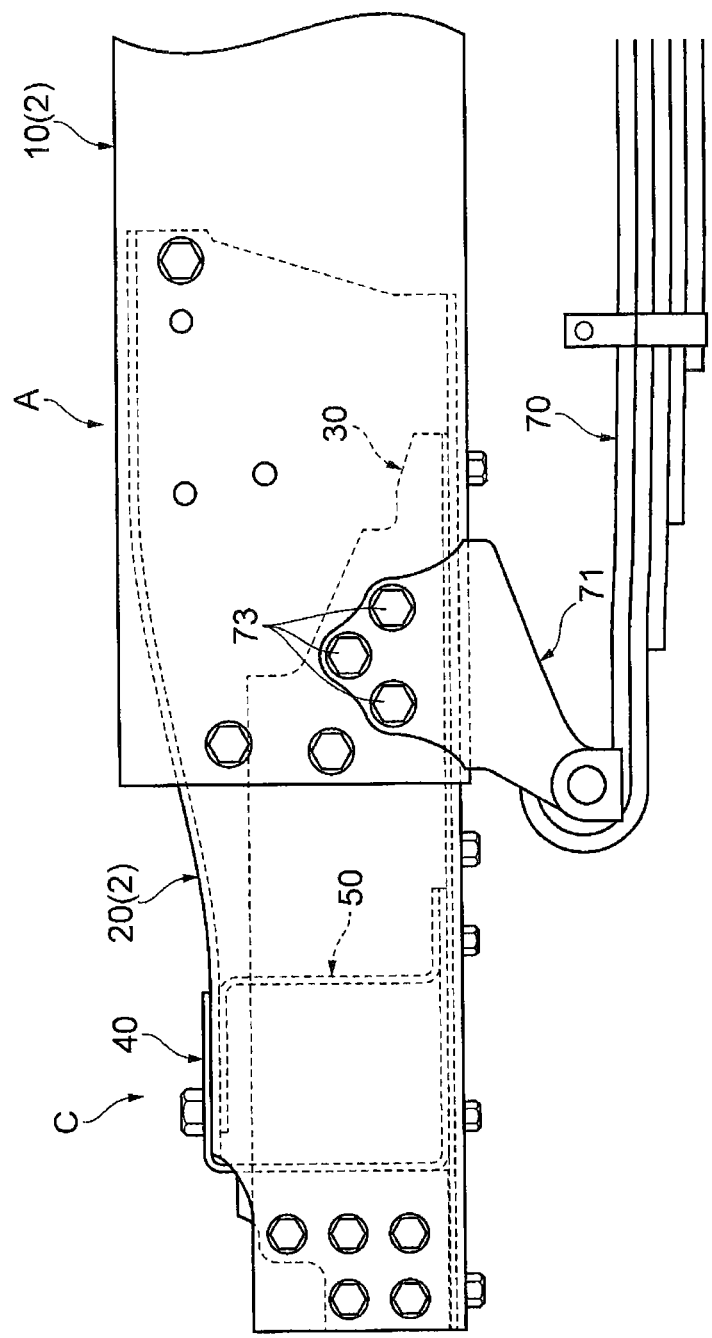
FIG. 11 is a side view illustrating a state where the spring bracket is attached.

FIGS. 10 and 11 are side views illustrating a state where a spring bracket is attached to the side rail. As illustrated in FIGS. 1 to 11, a spring bracket 71 used to attach a leaf spring 70 (a plate spring) of the vehicle is attached to the side rail connection portion A. Specifically, the side rail connection portion A is provided with a bolt hole 72 through which the main side rail side plate portion 11 and the extension side rail side plate portion 21 are inserted. Then, the spring bracket 71 is fastened by a bolt 73 inserted through the bolt hole 72. Accordingly, the spring bracket 71 is rigidly connected to the main side rail side plate portion 11 and the extension side rail side plate portion 21 at the side rail connection portion A. For this reason, the bolt hole 72 which is formed in the side rail connection portion A serves as a spring bracket attachment portion used to attach the spring bracket 71.

In addition, when the front end of the leaf spring 70 is disposed directly below the bolt hole 72 as illustrated in FIG. 10, the spring bracket 71 which extends downward from the bolt hole 72 may be used. Meanwhile, when the front end of the leaf spring 70 is disposed in front of the bolt hole 72 as illustrated in FIG. 11, the spring bracket 71 which extends downward from the bolt hole 72 while being inclined forward may be used.

Figure 12:
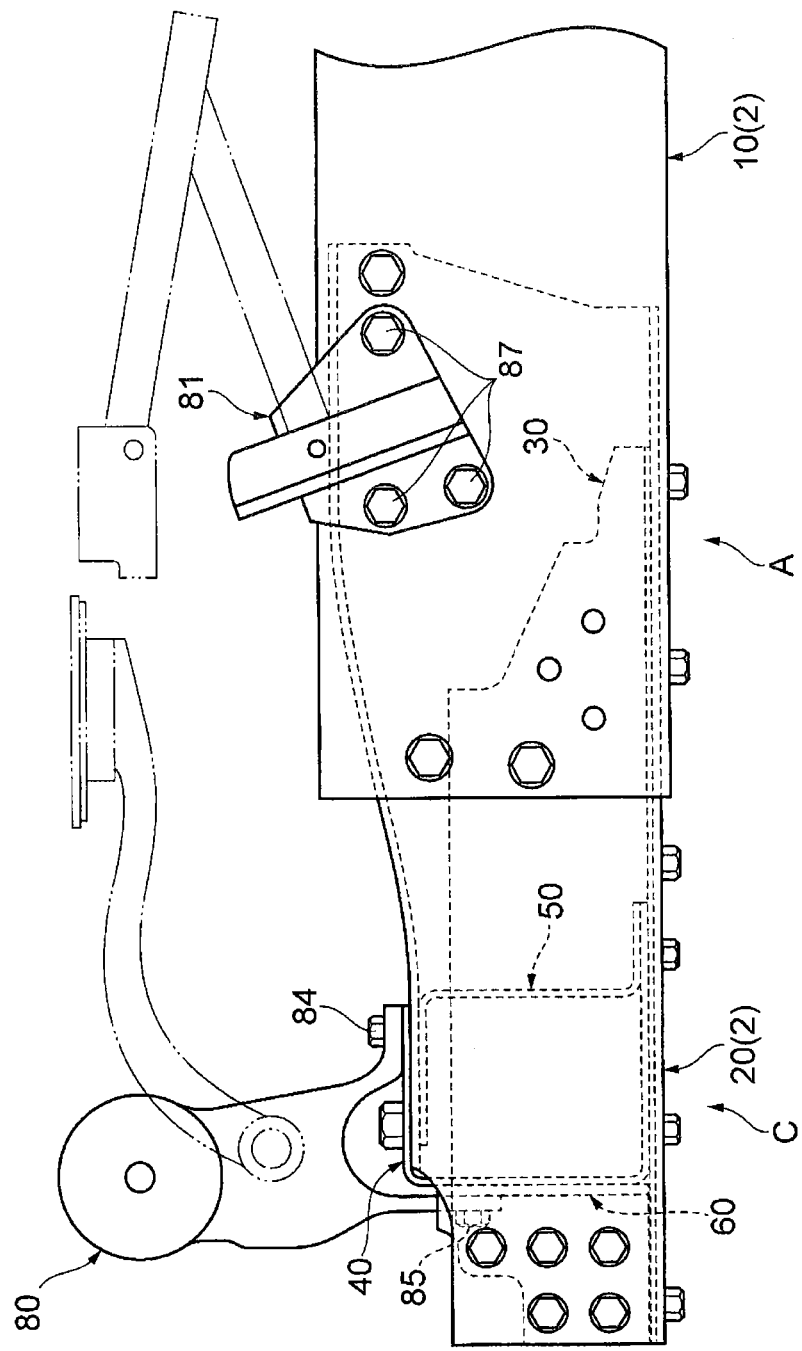
FIG. 12 is a side view illustrating a state where a cab mount and a tilt mechanism bracket are attached.
Figure 13:
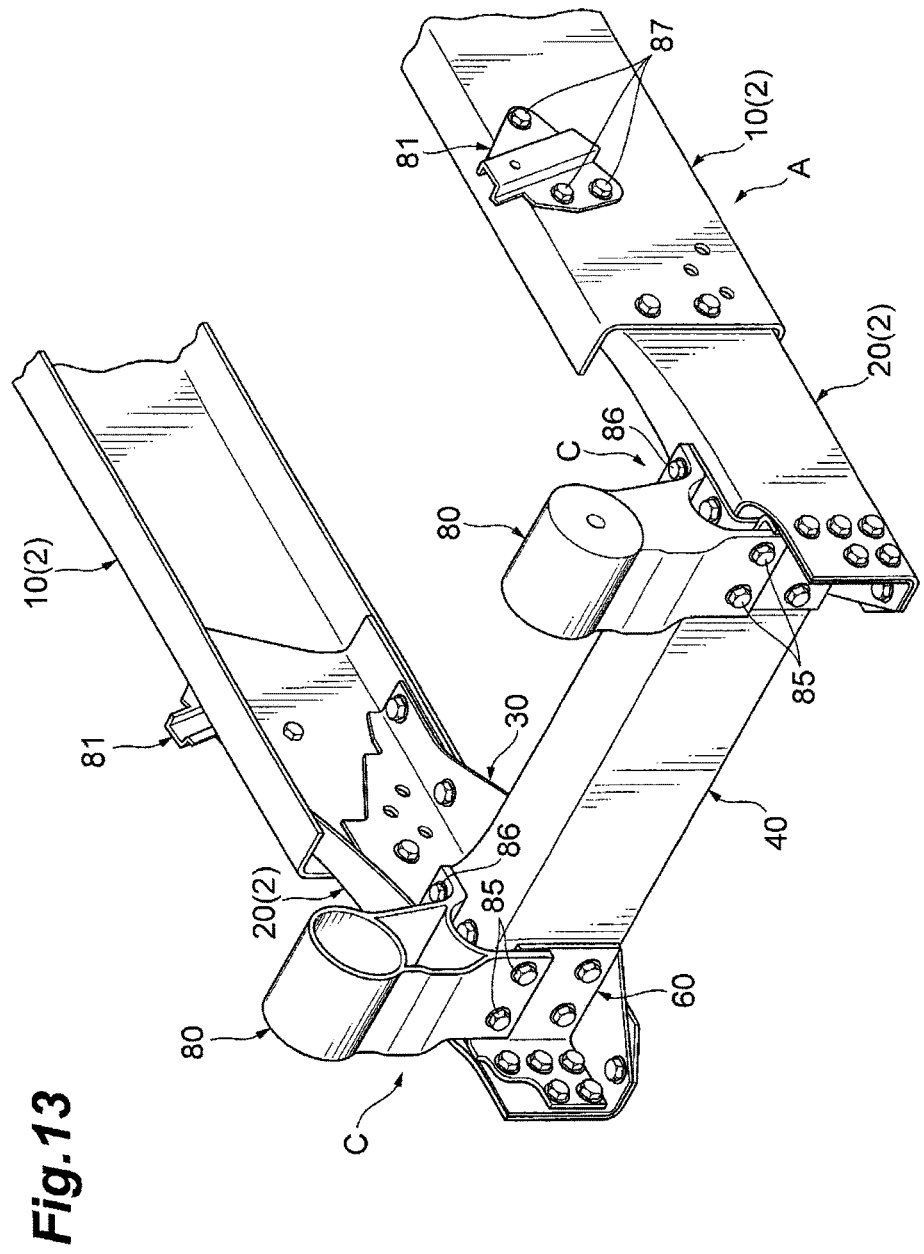
FIG. 13 is a perspective view illustrating a state where the cab mount and the tilt mechanism bracket are attached.

FIG. 12 is a side view illustrating a state where the cab mount and the tilt mechanism bracket are attached. FIG. 13 is a perspective view illustrating a state where the cab mount and the tilt mechanism bracket are attached. As illustrated in FIGS. 1 to 9 and FIGS. 12 and 13, a cab mount 80 for supporting a cab (not illustrated) of the vehicle is attached to the cross member connection portion C, and a tilt mechanism bracket 81 for supporting a tilt mechanism (not illustrated) raising the cab is attached to the side rail connection portion A.

Specifically, the cross member connection portion C is provided with a bolt hole 82 which penetrates the cross member upper plate portion 42 and the extension side rail upper plate portion 22 and a bolt hole 83 which penetrates the cross member side plate portion 41 and the first side plate portion 61 of the third reinforcement member. Then, the cab mount 80 is fastened by a bolt 84 inserted through the bolt hole 82 and the cab mount 80 is fastened by a bolt 85 inserted through the bolt hole 83. Accordingly, the cab mount 80 is rigidly connected to the cross member upper plate portion 42, the extension side rail upper plate portion 22, the cross member side plate portion 41, and the first side plate portion 61 of the third reinforcement member at the cross member connection portion C. For this reason, the bolt hole 82 and the bolt hole 83 formed in the cross member connection portion C serve as a cab mount attachment portion used to attach the cab mount 80.

Further, the side rail connection portion A is provided with a bolt hole 86 which penetrates the main side rail side plate portion 11 and the extension side rail side plate portion 21. Then, the tilt mechanism bracket 81 is fastened by a bolt 87 inserted through the bolt hole 86. Accordingly, the tilt mechanism bracket 81 is rigidly connected to the main side rail side plate portion 11 and the extension side rail side plate portion 21 at the side rail connection portion A. For this reason, the bolt hole 86 which is formed in the side rail connection portion A serves as a tilt mechanism bracket attachment portion used to attach the tilt mechanism bracket 81.

As described above, according to the frame structure 1 for the vehicle of the embodiment, the side rail 2 is divided into the main side rail 10 disposed at the rear side in the vehicle longitudinal direction and an extension side rail 20 disposed at the front side in the vehicle longitudinal direction. For this reason, the main side rail 10 may be manufactured by simple bending such as roll forming disclosed in Patent Literature 1. Meanwhile, the extension side rail 20 is formed so that the front portion is lower than the rear portion. For this reason, it is possible to ensure a space for disposing the cab above the extension side rail 20 and to ensure a space for disposing a plurality of wiring lines between the extension side rail 20 and the cab. Further, since the extension side rail 20 has a substantially C-shaped cross-section, the extension side rail may be manufactured by simple bending such as press forming. As a result, the entire frame structure may be easily manufactured while an increase in manufacturing cost is suppressed. Further, since the extension side rail 20 has a substantially C-shaped cross-section, wiring lines or the like may be accommodated at the inside of the extension side rail 20.

Further, since the side rail connection portion A is provided with the bolt hole 72 (the spring bracket attachment portion) to which the spring bracket 71 is attached, a load which is input from the leaf spring 70 may be appropriately received. Further, since the spring bracket 71 is formed separately from the main side rail 10 and the extension side rail 20, the structures of the main side rail 10 and the extension side rail 20 may be simplified. Accordingly, the main side rail 10 and the extension side rail 20 may be easily manufactured and an increase in the weight of the main side rail 10 and the extension side rail 20 may be suppressed.

Further, since the main side rail 10 and the extension side rail 20 are rigidly connected at the side plate portion and the lower plate portion, it is possible to suppress degradation in the connection strength between the main side rail 10 and the extension side rail 20. Meanwhile, since a stress state abruptly changes in the connection portion between the main side rail 10 and the extension side rail 20, a load easily concentrates thereon. However, since the main side rail 10 and the extension side rail 20 are not rigidly connected at the upper plate portion, a load which is generated at the connection portion may be appropriately released. Accordingly, the strength of the connection portion may be improved.

Further, since the cross member 40 is connected to the extension side rail 20, the rigidity of the extension side rail 20 may be drastically improved.

Further, since the cross member connection portion C is provided with the bolt hole 82 and the bolt hole 83 (the cab mount attachment portion) to which the cab mount 80 is attached, a load which is input from the cab may be appropriately received. Similarly, since the side rail connection portion A is provided with the bolt hole 86 (the tilt mechanism bracket attachment portion) to which the tilt mechanism bracket 81 is attached, a load which is input from the cab may be appropriately received.

Further, since the first reinforcement member 30 is provided, the support rigidity of the extension side rail 20 with respect to the main side rail 10 may be improved.

Further, since a closed cross-section is formed by the second reinforcement member 50 and the cross member 40 and the third reinforcement member 60 is provided, the rigidity of the cross member connection portion C as the cab mount attachment portion is improved. For this reason, the cab support force may be improved.

Further, since the second reinforcement member 50 is connected to the cross member 40, the rigidity of the cross member 40 at the cross member connection portion C may be drastically improved. Then, since the cross member 40 has a substantially C-shaped cross-section and the second reinforcement member 50 has a substantially Z-shaped cross-section, the cross member 40 and the second reinforcement member 50 may be manufactured by simple bending. Further, since the second reinforcement member lower plate portion 53 extends in a direction moving away from the cross member side plate portion 41, the second reinforcement member 50 is widened downward. For this reason, it is possible to stably support the cab mount 80 when the cab mount 80 is attached to the cross member connection portion C as the cab mount attachment portion.

While the embodiment has been described above, the invention is not limited to the above-described embodiment. For example, the extension side rail may be formed in any shape as long as the front portion is lower than the rear portion in the vehicle longitudinal direction. Further, the extension side rail lower plate portion may be also formed in a curved shape which is inclined downward and forward in the vehicle longitudinal direction similarly to the extension side rail upper plate portion.

Further, in the above-described embodiment, a description has been made in which the main side rail and the extension side rail are not rigidly connected at the upper plate portion. However, the main side rail and the extension side rail may be rigidly connected at the upper plate portion as long as any problem involved with the rigidity does not arise.

Further, in the above-described embodiment, the detailed installation positions of the spring bracket, the cab mount, and the tilt mechanism bracket have been described, but these components may be attached to the other positions as long as any problem involved with the rigidity does not arise.

REFERENCE SIGNS LIST 1 frame structure, 2 side rail, 10 main side rail, 11 main side rail side plate portion, 12 main side rail upper plate portion, 13 main side rail lower plate portion, 20 extension side rail, 21 extension side rail side plate portion, 22 extension side rail upper plate portion, 23 extension side rail lower plate portion, 30 first reinforcement member, 31 first reinforcement member side plate portion, 32 first reinforcement member lower plate portion, 33 first reinforcement member lower plate portion, 40 cross member, 41 cross member side plate portion, 42 cross member upper plate portion, 43 cross member lower plate portion, 50 second reinforcement member (reinforcement member), 51 second reinforcement member side plate portion, 52 second reinforcement member upper plate portion, 53 second reinforcement member lower plate portion, 60 third reinforcement member, 61 first side plate portion of third reinforcement member, 62 second side plate portion of third reinforcement member, 70 leaf spring, 71 spring bracket, 72 bolt hole (spring bracket attachment portion), 73 bolt, 80 cab mount, 81 tilt mechanism bracket, 82 bolt hole (cab mount attachment portion), 83 bolt hole (cab mount attachment portion), 84 bolt, 85 bolt, 86 bolt hole, 87 bolt, A side rail connection portion, B gap, C cross member connection portion

The invention claimed is:

1. A frame structure for a vehicle comprising:
    a pair of main side rails which extends in a vehicle longitudinal direction and faces each other; and
    a pair of extension side rails each of which includes a front portion and a rear portion in the vehicle longitudinal direction and is connected to a front portion of the main side rail in the vehicle longitudinal direction and extends in the vehicle longitudinal direction,
    wherein each of the extension side rails is formed so as to have a substantially C-shaped cross-section, and is formed so that a front portion is lower than rear portion in the vehicle height direction, and
    wherein a side rail connection portion in which the main side rail and the extension side rail are connected to each other is provided with a spring bracket attachment portion to attach a spring bracket of a leaf spring.

2. The frame structure for the vehicle according to claim 1,
    wherein each of the main side rails includes:
        a main side rail side plate portion which extends in the vehicle height direction,
        a main side rail upper plate portion which extends from an upper edge of the side plate portion inward in a vehicle width direction, and
        a main side rail lower plate portion which extends from a lower edge of the side plate portion inward in the vehicle width direction,
    wherein each of the extension side rails includes:
        an extension side rail side plate portion which extends in the vehicle height direction,
        an extension side rail upper plate portion which extends from an upper edge of the extension side rail side plate portion inward in the vehicle width direction, and
        an extension side rail lower plate portion which extends from a lower edge of the extension side rail side plate portion inward in the vehicle width direction, wherein the extension side rail side plate portion and the main side rail side plate portion are rigidly connected to each other, and the extension side rail lower plate portion and the main side rail lower plate portion are rigidly connected to each other, and wherein the extension side rail upper plate portion and the main side rail upper plate portion are not rigidly connected to each other.

3. The frame structure for the vehicle according to claim 1, further comprising:

a cross member that extends in the vehicle width direction while both ends thereof are connected to the pair of extension side rails, wherein a cross member connection portion in which the extension side rail and the cross member are connected to each other is provided with a cab mount attachment portion to which a cab mount supporting a cab of the vehicle is attached.

4. The frame structure for the vehicle according to claim 3, further comprising:

a reinforcement member that is connected to the cross member at the cross member connection portion so as to form a closed cross-section along with the cross member.

5. The frame structure for the vehicle according to claim 4, wherein the cross member includes:
a cross member side plate portion which extends in the vehicle height direction,
a cross member upper plate portion which extends from an upper edge of the cross member side plate portion backward in the vehicle longitudinal direction, and
a cross member lower plate portion which extends from a lower edge of the cross member side plate portion backward in the vehicle longitudinal direction, wherein the reinforcement member includes:
a reinforcement member side plate portion which extends in the vehicle height direction,
a reinforcement member upper plate portion which extends from an upper edge of the reinforcement member side plate portion forward in the vehicle longitudinal direction, and
a reinforcement member lower plate portion which extends from a lower edge of the reinforcement member side plate portion backward in the vehicle longitudinal direction, and wherein the reinforcement member upper plate portion and the cross member upper plate portion are rigidly connected to each other, and the reinforcement member lower plate portion and the cross member lower plate portion are rigidly connected to each other.

6. A frame structure for a vehicle comprising:

a pair of main side rails which extends in the a vehicle longitudinal direction and faces each other, each of the main side rails formed to a channel shape cross-section; and a pair of extension side rails each of which includes a front portion and a rear portion in the vehicle longitudinal direction and is connected to a front portion of the main side rail in the vehicle longitudinal direction and extends in the vehicle longitudinal direction, each of the extension side rails formed to have a channel shape cross-section, wherein the channel shape cross-section of the rear portion of the extension side rails and the channel shape cross-section of a front portion of the main side rails are dimensioned to fit one another closely, and wherein a height of the channel shape cross-section at the front portion of the extension side rails is less than the height of the channel shape cross-section at the rear portion of the extension side rails in a vehicle height direction.

7. A frame structure for a vehicle comprising:

a pair of main side rails which extends in the vehicle longitudinal direction and faces each other;

a pair of extension side rails each of which is connected to a front portion of the main side rail in the vehicle longitudinal direction and extends in the vehicle longitudinal direction;

a cross member that extends in the vehicle width direction while both ends thereof are connected to the pair of extension side rails; and a reinforcement member that is connected to the cross member at a cross member connection portion so as to form a closed cross-section along with the cross member, wherein the extension side rails are formed so as to have a substantially C-shaped cross-section, and are formed so that a front portion is lower than a rear portion in the vehicle longitudinal direction, and wherein the cross member connection portion in which the extension side rail and the cross member are connected to each other is provided with a cab mount attachment portion to which a cab mount supporting a cab of the vehicle is attached.

8. The frame structure for the vehicle according to claim 7, wherein the cross member includes:
a cross member side plate portion which extends in the vehicle height direction,
a cross member upper plate portion which extends from an upper edge of the cross member side plate portion backward in the vehicle longitudinal direction, and
a cross member lower plate portion which extends from a lower edge of the cross member side plate portion backward in the vehicle longitudinal direction, wherein the reinforcement member includes:
a reinforcement member side plate portion which extends in the vehicle height direction,
a reinforcement member upper plate portion which extends from an upper edge of the reinforcement member side plate portion forward in the vehicle longitudinal direction, and
a reinforcement member lower plate portion which extends from a lower edge of the reinforcement member side plate portion backward in the vehicle longitudinal direction, and wherein the reinforcement member upper plate portion and the cross member upper plate portion are rigidly connected to each other, and the reinforcement member lower plate portion and the cross member lower plate portion are rigidly connected to each other.

* * * * *